US011231773B2

United States Patent
Ross et al.

(10) Patent No.: US 11,231,773 B2
(45) Date of Patent: *Jan. 25, 2022

(54) SYSTEM AND METHOD FOR GENERATING A VIRTUAL REALITY SCENE BASED ON INDIVIDUAL ASYNCHRONOUS MOTION CAPTURE RECORDINGS

(71) Applicant: Mindshow Inc., Los Angeles, CA (US)

(72) Inventors: Jonathan Michael Ross, Santa Monica, CA (US); Gil Baron, Los Angeles, CA (US)

(73) Assignee: Mindshow Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/203,646

(22) Filed: Mar. 16, 2021

(65) Prior Publication Data
US 2021/0200303 A1    Jul. 1, 2021

Related U.S. Application Data

(63) Continuation of application No. 16/854,684, filed on Apr. 21, 2020, now Pat. No. 10,969,860, which is a
(Continued)

(51) Int. Cl.
*G06F 3/01*    (2006.01)
*G06F 3/0481*    (2013.01)
(Continued)

(52) U.S. Cl.
CPC .............. *G06F 3/011* (2013.01); *A63F 13/00* (2013.01); *G06F 3/017* (2013.01);
(Continued)

(58) Field of Classification Search
CPC ...... G06F 3/011; G06F 3/017; G06F 3/04815; G06F 3/16; G06F 3/167; A63F 13/00; G06T 13/40; G06T 19/20; G06T 2219/024
See application file for complete search history.

(56) References Cited

U.S. PATENT DOCUMENTS 8,284,157 B2    10/2012    Markovic
9,159,151 B2 *  10/2015    Perez ..................... G06F 3/011
(Continued)

FOREIGN PATENT DOCUMENTS

WO    2003058518 A2    7/2003

OTHER PUBLICATIONS

Morozov, Mikhail, et al., Asynchronous Immersive Classes in a 3D Virtual World: Extended Description of vAcademia; LNCS 7848, 2013, Special Issue of Transaction on Computational Sciences, (20 pages).
(Continued)

*Primary Examiner* — Haoshian Shih
*Assistant Examiner* — Darrin Hope
(74) *Attorney, Agent, or Firm* — Esplin & Associates, PC

(57) ABSTRACT

A system configured to generate and/or modify three-dimensional scenes comprising animated character(s) based on individual asynchronous motion capture recordings. The system may comprise sensor(s), display(s), and/or processor(s). The system may receive selection of a first character to virtually embody within the virtual space, receive a first request to capture the motion and/or the sound for the first character, and/or record first motion capture information characterizing the motion and/or the sound made by the first user as the first user virtually embodies the first character. The system may receive selection of a second character to virtually embody, receive a second request to capture the motion and/or the sound for the second character, and/or record second motion capture information. The system may generate a compiled virtual reality scene wherein the first character and the second character appear animated within the compiled virtual reality scene contemporaneously.

20 Claims, 11 Drawing Sheets

Related U.S. Application Data continuation of application No. 16/295,376, filed on Mar. 7, 2019, now Pat. No. 10,664,045, which is a continuation of application No. 15/603,099, filed on May 23, 2017, now Pat. No. 10,228,760.

(51) Int. Cl.
*G06F 3/16* (2006.01)
*G06T 13/40* (2011.01)
*G06T 19/20* (2011.01)
*A63F 13/00* (2014.01)

(52) U.S. Cl.
CPC ............ *G06F 3/04815* (2013.01); *G06F 3/16* (2013.01); *G06F 3/167* (2013.01); *G06T 13/40* (2013.01); *G06T 19/20* (2013.01); *G06T 2219/024* (2013.01)

(56) References Cited

U.S. PATENT DOCUMENTS

| | | |
|---|---|---|
| 10,664,045 B2 | 5/2020 | Ross |
| 2009/0307189 A1 | 12/2009 | Bobbitt |
| 2010/0008639 A1 | 1/2010 | Greenberg |
| 2017/0046906 A1 | 2/2017 | Hilbert |
| 2017/0061704 A1 | 3/2017 | Gewicke |
| 2019/0204906 A1 | 7/2019 | Ross |
| 2020/0249747 A1 | 8/2020 | Ross |

OTHER PUBLICATIONS

Greenhalgh, et al., Temporal Links: Recording and Replaying Virtual Environments, 2000, School of Computer Science and Information Technology, The University of Nottingham (8 pages).

\* cited by examiner

SYSTEM AND METHOD FOR GENERATING A VIRTUAL REALITY SCENE BASED ON INDIVIDUAL ASYNCHRONOUS MOTION CAPTURE RECORDINGS

FIELD OF THE DISCLOSURE

This disclosure relates to a system and method for animating characters based on motion capture and/or generating a compiled virtual reality scene based on individual asynchronous motion capture recordings.

BACKGROUND

Virtual reality headset display devices are known. These devices visually simulate a user's physical presence in a virtual space. Simulations typically include a 360° view of the user's surrounding virtual space such that user may turn his head, lean, walk, run, and/or otherwise physically maneuver to view and/or navigate different portions of the surrounding space.

Motion capture is generally known. A user's motions, sounds, and/or other actions may be captured by a computer and reflected in the motions, sounds, and/or other actions of a character within a scene.

SUMMARY

A system configured to generate and/or modify three-dimensional scenes comprising animated characters based on individual asynchronous motion capture recordings may enable one or more users to record and/or create virtual reality content asynchronously. The virtual reality content may include scenes depicting multiple characters and/or the interaction of the multiple characters with each other and/or the virtual environment. The system may enable one or more users to asynchronously record the actions of one or more of the multiple characters within the scene via motion capture. By way of non-limiting example, one or more users may individually record the characters (e.g., one at a time per user) that appear within the same compiled virtual reality scene contemporaneously. When recording the actions to be manifested by one or more of the characters within the compiled virtual reality scene contemporaneously, the one or more users may be able to see manifestations of the previous recorded actions of one or more of the users by one or more other characters. As such, the user recording their actions for a given character may be able to interact with and/or react to previously recorded characters contemporaneously as will be reflected in the compiled virtual reality scene.

As used herein, "virtual reality" may refer to what is traditionally considered virtual reality as well as augmented reality, mixed reality (MR), and/or other similar concepts. In some implementations, "virtual reality" may refer to a form of virtual reality/augmented reality hybrid and/or include an aspect and/or ability to view content in an augmented reality way.

In some implementations, the system may comprise one or more: sensors, computing device(s), displays, server(s), processor(s), electronic storage, and/or other components. The sensors may be configured to generate output signals conveying information related to related to motion, sound, and/or other actions made by one or more users in physical space. The sensors may be configured to capture the motion and/or the sound made by the one or more users.

The user interface may include a display and/or other components. The display may be configured to present the virtual reality content to the user. The display(s) may be configured to present virtual reality content to the one or more users. Presentation of the virtual reality content via a display may simulate the presence of a user within a virtual space. The virtual space may be fixed relative to physical space. The one or more display(s) may be configured to present options for recording the motion and/or the sound for one or more of the characters within the virtual space. The display may be controlled by the processor to present the virtual reality content to the user.

A system configured to generate and/or modify three-dimensional scenes comprising animated characters based on individual asynchronous motion capture recordings may include one or more server(s) and/or one or more computing device(s). The server(s) may include one or more processors configured by machine-readable instructions to execute computer program components. The processor may be configured to execute computer program components. The computer program components may be configured to enable an expert and/or user to interface with the system and/or provide other functionality attributed herein to the computing devices, the sensor, the electronic storage, and/or the processor. The server(s) may include one or more processors configured by machine-readable instructions to execute computer program components. The computer program components may include one or more of: a display component, a selection component, a motion capture component, a compilation component, and/or other components.

The display component may be configured to cause the display(s) to present the virtual reality content, an editing scene, the compiled virtual reality scene, and/or other content to the user. The display component may be configured to provide and/or transmit the virtual reality content over the network to one or more computing devices for viewing, recording, editing, and/or otherwise creating and/or sharing the compiled virtual reality scene.

In some implementations, the virtual reality content may include an editing scene. The editing scene may be an editing version of the compiled scene that is presented to the one or more users while recording motion capture information for one or more characters. The display component may be configured to generate, provide, and/or transmit information for providing the editing scene to uses via the one or more computing device(s).

The selection component may be configured to receive selection of one or more characters to virtually embody within the virtual space. Selection of the one or more characters to virtually embody may be input by the one or more users via the user interface. Virtually embodying a character within the virtual space may include experiencing and/or interacting with the virtual space as the character. Virtually embodying a character may enable a user to record the motion and/or the sound made by the character within the compiled virtual reality scene. In some implementations, selection of a first character to virtually embody within the virtual space may be received by the selection component. Responsive to receiving selection of the first character by the selection component, the system may enable the first user to record the motion, the sound, and/or other actions to be made by the first character within the compiled virtual reality scene.

The motion capture component may be configured to receive one or more requests to capture the motion and/or the sound for one or more characters within the compiled virtual reality scene. A request to capture the motion and/or sound for a character may initiate recording of the motion, sound, and/or other actions of a user to be manifested by the character within the compiled virtual reality scene. In some implementations, the motion capture component may receive a first request to capture the motion, the sound, and/or other actions for the first character.

The motion capture component may be configured to record motion capture information characterizing the motion and/or the sound made by a user as the user virtually embodies a character. The motion capture component may record the motion capture information based on the output signals generated by the sensors.

In some implementations, the motion capture component may be configured to record first motion capture information characterizing the motion, the sound, and/or other actions made by the first user as the first user virtually embodies the first character. The first motion capture information may be captured in a manner such that the actions of the first user may be manifested by the first character within the compiled virtual reality scene.

The selection component may be configured to receive selection of a second character to virtually embody. The second character may be separate and distinct from the first character. Virtually embodying the second character may enable the first user or another user to record one or more of the motion, the sound, and/or other actions to be made by the second character within the compiled virtual reality scene.

The motion capture component may be configured to receive a second request to capture the motion, the sound, and/or other actions for the second character. The motion capture component may be configured to record second motion capture information that characterizes the motion, the sound, and/or the other actions made by the first user or other user as the first user or the other user virtually embodies the second character. The second motion capture information may be captured in a manner such that the actions of the first user or the other user are manifested by the second character within the compiled virtual reality scene. The actions of the first user or the other user may be manifested by the second character within the compiled virtual reality scene contemporaneously with the actions of the first user manifested by the first character within the compiled virtual reality scene. By way of non-limiting example, the first character, the second character, and/or other characters may appear to interact with each other and/or react to occurrences (e.g., actions by one or more characters, and/or other occurrences within the virtual space) performed within the same compiled virtual reality scene.

The compilation component may be configured to generate the compiled virtual reality scene. In some implementations, compiling the compiled virtual reality scene may include receiving the compiled virtual reality scene from one or more servers associated with the system. The compiled virtual reality scene may include animation of the first character, the second character, and/or other characters such that the first character, the second character, and/or the other characters appear animated within the compiled virtual reality scene contemporaneously.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The present system may be configured to generate and/or modify three-dimensional scenes comprising animated characters based on individual asynchronous motion capture recordings. The present system may enable one or more users to record and/or create virtual reality content by asynchronously recording individual characters via motion capture. The individual recordings may be combined into a compiled virtual reality scene having animated characters that are animated based on the motion capture information. The one or more users may individually record the motion, sound, and/or actions to be manifested by individual ones of the characters by initiating recording for a given character and performing the motion, sound, and/or other actions. The motion, sound, and/or actions to be manifested by individual ones of the characters within the compiled virtual reality scene may be characterized by motion capture information recorded by one or more sensors and/or other components of the computing device and/or the system. The motion capture information may be recorded individually and/or asynchronously such that an aggregation of the individual characters recorded (e.g., the compiled virtual reality scene) reflects the multiple characters acting, performing, and/or interacting contemporaneously within the same virtual reality scene (i.e., the compiled virtual reality scene).

Figure 1:
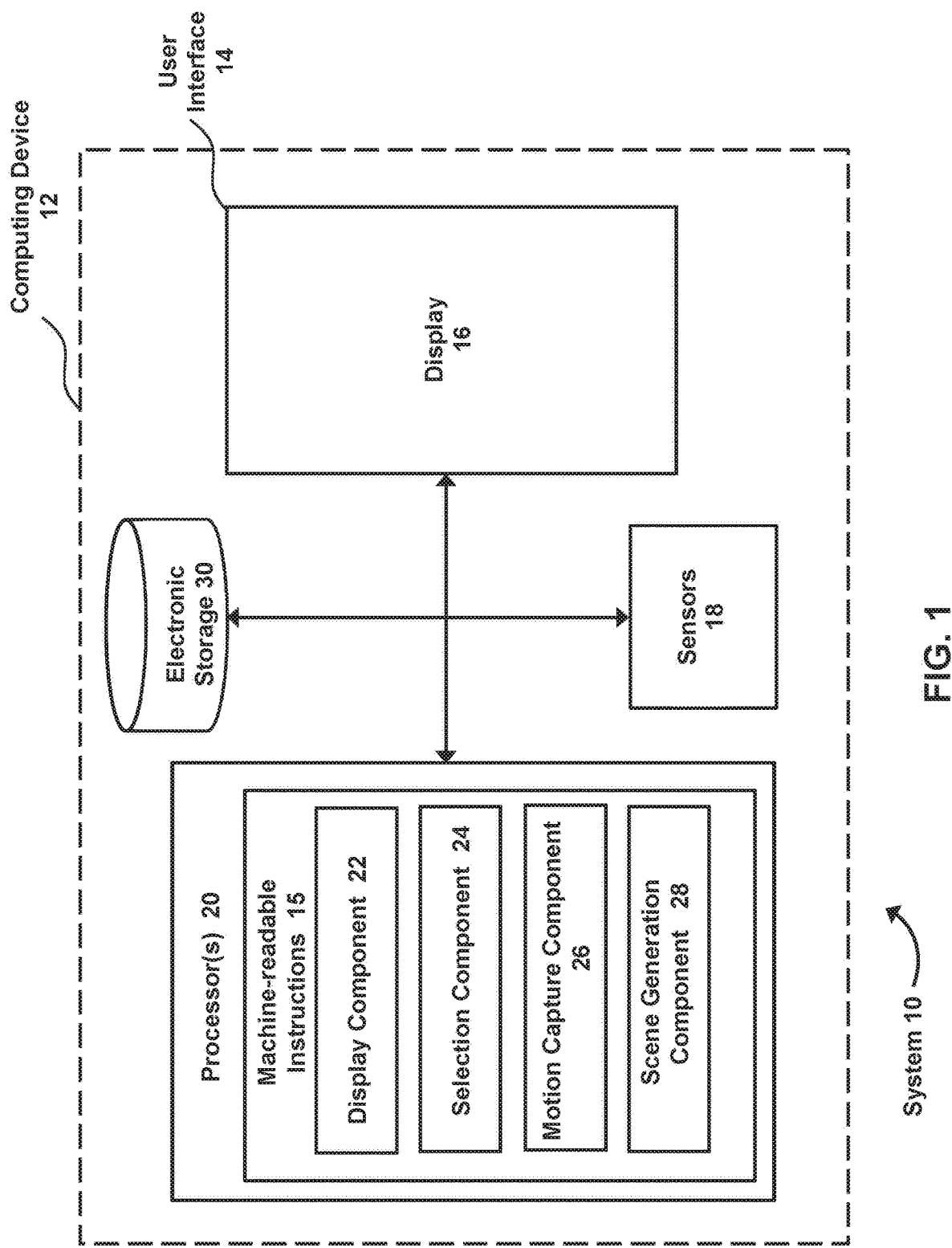
FIG. 1 illustrates a system configured to generate and/or modify three-dimensional scenes comprising animated characters based on individual asynchronous motion capture recordings, in accordance with one or more implementations.

FIG. 1 illustrates a system 10 configured to generate and/or modify three-dimensional scenes comprising animated characters based on individual asynchronous motion capture recordings, in accordance with one or more implementations. System 10 may include one or more sensors 18 configured to generate to capture the motion, the sound, and/or the other actions made by the one or more users. Capturing the motion of the one or more users may include capturing the physical movement and/or muscle articulation of at least a portion of the user's body (e.g., arms, legs, torso, head, knees, elbows, hands, feet, eyes, mouth, etc.). Capturing the motion of one or more users may include capturing the body position, movement and muscle articulation for large scale body poses and motions, and/or movement and muscle articulation for small scale things (e.g., eye direction, squinting, and/or other small scale movement and/or articulation). System 10 may include one or more displays that present content to one or more users. The content may include three-dimensional content, two-dimensional content, and/or other content. For example, the content may include one or more of virtual reality content, augmented reality content, mixed-media content, and/or other three-dimensional and/or two-dimensional content. Presentation of the virtual reality content via a display 16 may simulate presence of a user within a virtual space that is fixed relative to physical space. System 10 may include one or more physical processors 20 configured by machine-readable instructions 15. System 10 may be configured to receive selection of a first character to virtually embody within the virtual space. Virtually embodying the first character may enable a first user to record the motion, the sound, and/or other actions to be made by the first character within the compiled virtual reality scene. System 10 may receive a first request to capture the motion, the sound, and/or other actions for the first character. System 10 may record first motion capture information characterizing the motion, the sound, and/or other actions made by the first user as the first user virtually embodies the first character.

The first motion capture information may be captured in a manner such that the actions of the first user may be manifested by the first character within the compiled virtual reality scene. System 10 may be configured to receive selection of a second character to virtually embody. The second character may be separate and distinct from the first character. Virtually embodying the second character may enable the first user or another user to record one or more of the motion, the sound, and/or other actions to be made by the second character within the compiled virtual reality scene. System 10 may receive a second request to capture the motion, the sound, and/or other actions for the second character. The system may be configured to record second motion capture information that characterizes the motion, the sound, and/or other actions made by the first user or other user as the first user or the other user virtually embodies the second character. The second motion capture information may be captured in a manner such that the actions of the first user or the other user may be manifested by the second character contemporaneously with the actions of the first user manifested by the first character within the compiled virtual reality scene. System 10 may be configured to generate the compiled virtual reality scene including animation of the first character, the second character, and/or other characters such that the first character, the second character, and/or other characters appear animated within the compiled virtual reality scene contemporaneously.

The compiled virtual reality scene may include one or more of a clip, show, movie, short film, and/or virtual reality experience recorded and/or generated based on motion capture of one or more users. By way of non-limiting example, motion capture may include tracking the motion, physical movements, and/or muscle articulations of one or more users. Motion capture may include one or more of body tracking, physical location tracking, facial tracking, eye tracking, hand tracking, foot tracking, elbow tracking, knee tracking, and/or any type of tracking that may enable recording and/or capture of users' motions, physical movements, muscle articulations, expressions, postures, reflexes, and/or other motions and/or movements. The compiled virtual reality scene may include animations of one or more characters, virtual objects, virtual scenery, virtual scenery objects, and/or other virtual items. The animations may be based on the motion capture of the one or more users while virtually embodying individual ones of the characters included in the compiled virtual reality scene. In some implementations, the animations may be based on user inputs received via one or more input methods (e.g., controlled based inputs, and/or other inputs).

By way of non-limiting example, one or more users may individually record the characters (e.g., one at a time per user) that appear within the same compiled virtual reality scene contemporaneously. When recording the actions to be manifested by a character within the compiled virtual reality scene, system 10 may be configured to present an editing scene to the user. The editing scene may include the manifestations of one or more users previous motions, sounds, and/or actions by one or more characters such that user may be able to interact with the previously recorded character(s) while recording the motions, sounds, and/or actions to be manifested by another character. In some implementations, the editing scene may include a recording input option to initiate recording of user's actions to be manifested by the character the user selected. As such, the user recording their actions for a given character may be able to interact and/or react with previously recorded characters contemporaneously as will be reflected in the compiled virtual reality scene.

As used herein, "virtual reality" may refer to what is traditionally considered virtual reality as well as augmented reality and/or other similar concepts. In some implementations, "virtual reality" may refer to a form of virtual reality/augmented reality hybrid and/or include an aspect and/or ability to view content in an augmented reality way. For example, creators may generate traditional virtual reality content but use augmented reality cameras to keep the user's peripheral vision open so they can keep an eye on the physical world around them.

In some implementations, system 10 may comprise one or more of a user interface 14 (which may include a display 16 and/or other components as described herein), sensors 18, a processor 20, electronic storage 30, and/or other components. In some implementations, one or more components of system 10 may be included in a single computing device 12. In some implementations, computing device 12 may be associated with the user. For example, computing device 12 may be owned by the user, carried by the user, operated by the user, and/or associated with the user in other ways. Computing device 12 may include communication lines, or ports to enable the exchange of information with a network, and/or other computing platforms. Computing device 12 may include a plurality of hardware, software, and/or firmware components operating together to provide the functionality attributed herein to computing device 12. Computing device 12 may include, for example, a cellular telephone, a smartphone, a laptop, a tablet computer, a desktop computer, a television set-top box, smart TV, a gaming console, a virtual reality headset, and/or other devices. In some implementations, individual components of system 10 (e.g., display 16, sensors 18) may be coupled to (e.g., wired to, configured to wirelessly communicate with) computing device 12 without being included in computing device 12. In some implementations, server 40 may be configured to communicate with computing device 12 via a client computing device.

In some implementations, computing device 12 may include one or more components (e.g., hardware and/or software) configured to facilitate recording of the user motions, sounds, and/or other actions for use by system 10. The user motions may include physical movement and/or muscle articulation of at least a portion of the user's body (e.g., arms, legs, torso, head, knees, elbows, hands, feet, eyes, mouth, etc.). Recording user motions may account for body position, movement and muscle articulation for large scale body poses, and/or movement and muscle articulation for small scale things (e.g., eye direction, squinting, and/or other small scale movement and/or articulation). This may include, for example, recoding user movements, muscle articulations, positions, gestures, actions, noises, dialogue, and/or other motions, sounds, and/or actions. The one or more components configured to facilitate recording of user motions, sounds, and/or other actions may include, for example, sensors 18. In some implementations, the one or more components configured to facilitate recording of user motions, sounds, and/or other actions may include, for example, one or more user input controllers (e.g., special controllers for puppeteering, etc.).

System 10 may include one or more processor(s) 20 configured by machine-readable instructions 21 to execute computer program components. The processor may be configured to execute computer program components 22-28. The computer program components may be configured to enable an expert and/or user to interface with the system and/or provide other functionality attributed herein to the computing devices, the sensors, the electronic storage, and/or the processor. The computer program components may include one or more of: a display component 22, a selection component 24, a motion capture component 26, a scene generation component 28, and/or other components.

Display component 22 may be configured to cause the display(s) 16 to present the virtual reality content to one or more users. Presenting virtual reality content to the one or more users may simulate the user(s)' presence within a virtual space. The virtual reality content may include one or more of an editing scene, the compiled virtual reality scene, and/or other virtual reality content. The display component may be configured to provide and/or transmit the virtual reality content for presentation over the network to one or more computing devices for viewing, recording, editing, and/or otherwise creating and/or sharing the compiled virtual reality scene.

In some implementations, the virtual reality content may include an editing scene. The editing scene may be an editing version of the compiled scene that is presented to the one or more users while recording motion capture information for one or more characters. In some implementations, a user may be able to change the timing, physical placement, scale, and/or other attributes of the motion capture information and/or the compiled virtual reality scene via the editing scene. The display component may be configured to generate, provide, and/or transmit information for providing the virtual reality space and/or virtual reality content to users via the one or more computing device(s).

The presented virtual reality content may correspond to one or more of a view direction of the user, a physical position of the user, a virtual position of the user within the virtual space, and/or other information. In some implementations, the display may be included in a virtual reality headset worn by the user. It should be noted that the description of the display provided herein is not intended to be limiting. Rather, the description of the display is intended to include future evolutions of virtual reality display technology (which may not even be display based, for example). For example, the display may include cameras and/or systems for augmented reality, and/or other augmented reality components, light field imaging devices that project an image onto the back of a user's retina (e.g., near-eye light field displays, etc.) virtual reality technology that utilizes contact lenses, virtual reality technology that communicates directly with the brain, and/or other display technology.

Views of the virtual space may correspond to a location in the virtual space (e.g., a location in a scene). The location may have a topography, express contemporaneous interaction between one or more characters and/or a user, and/or include one or more objects positioned within the topography that are capable of locomotion within the topography. In some implementations, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The views of the virtual space may be presented to the user such that a user may move through the virtual space and interact with the virtual space as the user would move through and interact with a corresponding physical space. For example, a user may walk and/or run through the virtual space, sit down, stand up, stop and observe an object in the virtual space, look up/down/left/right/etc., lean to look around an object in the virtual space, and/or other movements and/or interactions.

The above description of the views of the virtual space is not intended to be limiting. The virtual space may be expressed in a more limited, or richer, manner. For example, in some implementations, views determined for the virtual space may be selected from a limited set of graphics depicting an event in a given place within the virtual space. In some implementations, views determined for the virtual space may include additional content (e.g., text, audio, pre-stored video content, and/or other content) that describe, augment, and/or overlay particulars of the current, previous, and/or future state of the place.

System 10 may include user interface 14. User interface 14 may include display 16, one or more input controls, (not illustrated) and/or other components. Display 16 may be configured to present the virtual space and/or the virtual reality content to the user. Presentation of the virtual reality content via display 16 may simulate the presence of a user within a virtual space. The virtual space may be fixed relative to physical space. System 10 may include multiple displays 16, and/or be configured to communicate with one or more servers, computer devices, and/or displays associated with other users. The one or more display(s) may be configured to present options for recording the motion and/or the sound for one or more of the characters within the virtual space. The options may include one or more of: a start/stop option for recording motion capture information; character selection options from which a user may select one or more characters to include in the compiled virtual reality scene; scene selection options from which a user may select one or more virtual scenery themes, virtual scenery objects, and/or virtual items; and/or other options. The display may be controlled by processor 20 to present, select, record, and/or otherwise generate the virtual reality content.

Figure 2:
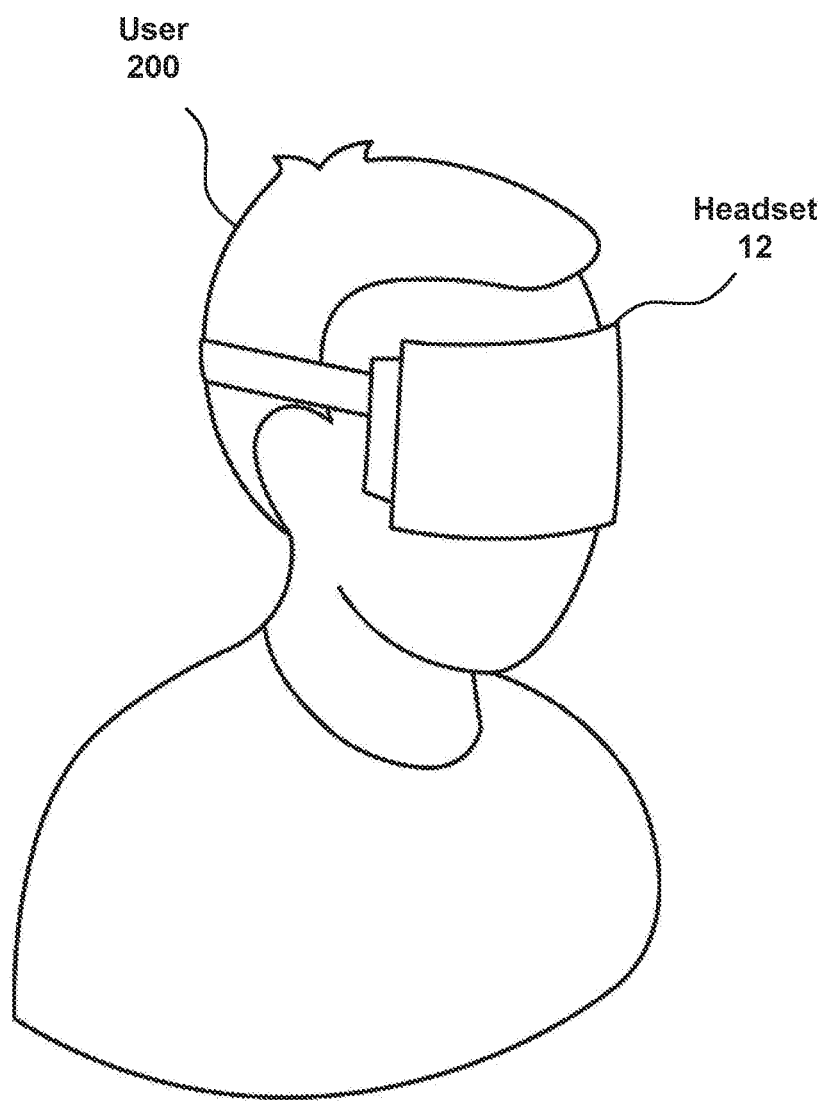
FIG. 2, depicts a computing device illustrated as a virtual reality headset that is worn on the head of a user, in accordance with one or more implementations.

FIG. 2, depicts computing device 12 illustrated as a virtual reality headset that is worn on the head of a user 200. The virtual reality content may be presented to the user in a virtual space via a display included in the headset. The virtual reality headset may be configured such that a perception of a three dimensional space is created by two stereoscopic movies, one generated for each eye, that are each being rendered in real time and then displayed. The convergence of these two movies in real time—one image to each eye (along with how those views are reactive to viewer head rotation and position in space)—may create a specific kind of immersive 3D effect and/or a sensation of presence in a virtual world. Presenting the virtual reality content to the user in the virtual space may include presenting one or more views of the virtual space to the user. Users may participate in the virtual space by interacting with content presented to the user in the virtual space. The content presented to the user may include a virtual space having one or more virtual events, characters, objects, and/or settings; an editing scene; a compiled virtual reality scene; and/or other content. In some implementations, the virtual reality content may be similarly presented to the user via one or more screens, projection devices, three dimensional image generation devices, light field imaging devices that project an image onto the back of a user's retina, virtual reality technology that utilizes contact lenses, virtual reality technology that communicates directly with (e.g., transmits signals to and/or receives signals from) the brain, and/or other devices configured to display the virtual reality content to the user.

Figure 3:
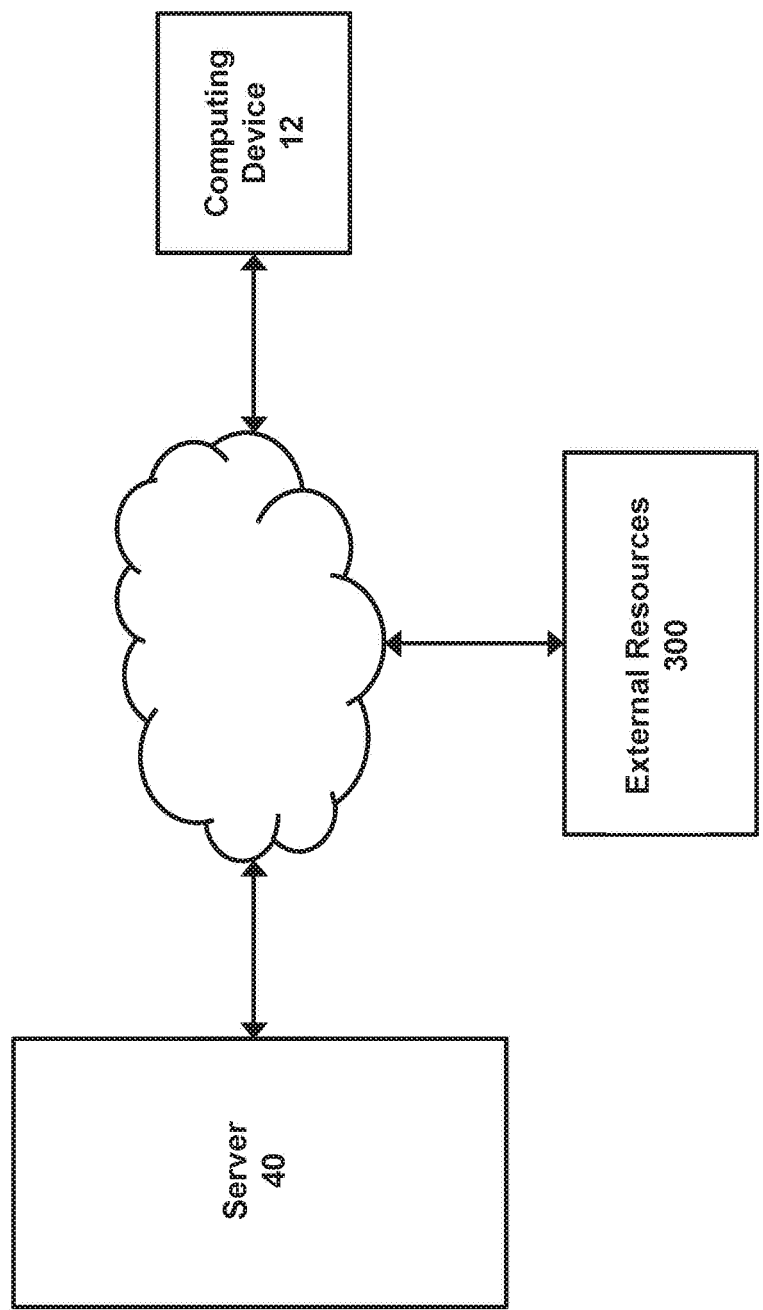
FIG. 3 illustrates a server configured to communicate with a computing device via a network, in accordance with one or more implementations.

FIG. 3 illustrates a server 40 configured to communicate with computing device 12 via a network, in accordance with one or more implementations. In some implementations, server 40 may be configured to provide the virtual space by hosting the virtual reality content over a network, such as the Internet. Server 40 may include electronic storage, one or more processors, communication components, and/or other components. Server 40 may include communication lines, or ports to enable the exchange of information with a network and/or other computing devices. Server 40 may include a plurality of hardware, software, and/or firmware components operating together to provide the functionality attributed herein to server 40. For example, server 40 may be implemented by a cloud of computing devices operating together as server 40.

Server 40 may be configured to execute computer readable instructions to perform one or more functionalities attributed to the computing device(s) 12, and/or one or more other functions. By way of non-limiting example, sever 40 may include one or more processors configured by machine-readable instructions to host, generate, transmit, provide, and/or facilitate presentation of virtual reality content to the computing device(s) 12; provide an editing scene to the computing device(s) 12; receive motion capture information from one or more of the computing device(s) 12; generate the complied virtual reality scene (e.g., based on the motion capture information received from the one or more computing device(s)); and/or otherwise facilitate animation of characters based on motion capture and/or generation of a compiled virtual reality scene based on individual asynchronous motion capture recordings.

For example, server 40 may be configured such that one or more users record the motion, the sound, and/or the actions for one or more characters for a compiled virtual reality scene individually. By way of non-limiting example, the motion capture for individual ones of the multiple characters that are to appear animated in a compiled virtual reality scene may be recorded asynchronously by different users, via different computing devices, and/or located at different physical locations.

External resources 300 may include sources of information that are outside of system 10, external entities participating with system 10, and/or other resources. In some implementations, some or all of the functionality attributed herein to external resources 300 may be provided by resources included in system 10.

Returning to FIG. 1, sensors 18 may be configured to generate output signals conveying information related to related to motion, sound, and/or other actions made by one or more users in physical space. Sensors 18 may, for example, record user movements, muscle articulations, positions, gestures, actions, noises, dialogue, and/or other motions, sounds, and/or actions. Sensors 18 may be configured to capture the motion and/or the sound made by the one or more users. The motion(s) captured via sensors 18 may include physical movement and/or muscle articulation of at least a portion of the user's body (e.g., arms, legs, torso, head, knees, elbows, hands, feet, eyes, mouth, etc.). Recording user motions may account for body position, movement and muscle articulation for large scale body poses, and/or movement and muscle articulation for small scale things (e.g., eye direction, squinting, and/or other small scale movement and/or articulation). In some implementations, the sensors may include one or more cameras and/or other optical sensors, inertial sensors, mechanical motion sensors, magnetic sensors, depth sensors, microphones, gyrosensor, accelerometer, laser position sensor, pressure sensors, volumetric sensors, voxel recordings/sensors, and/or other sensors.

Figure 4:
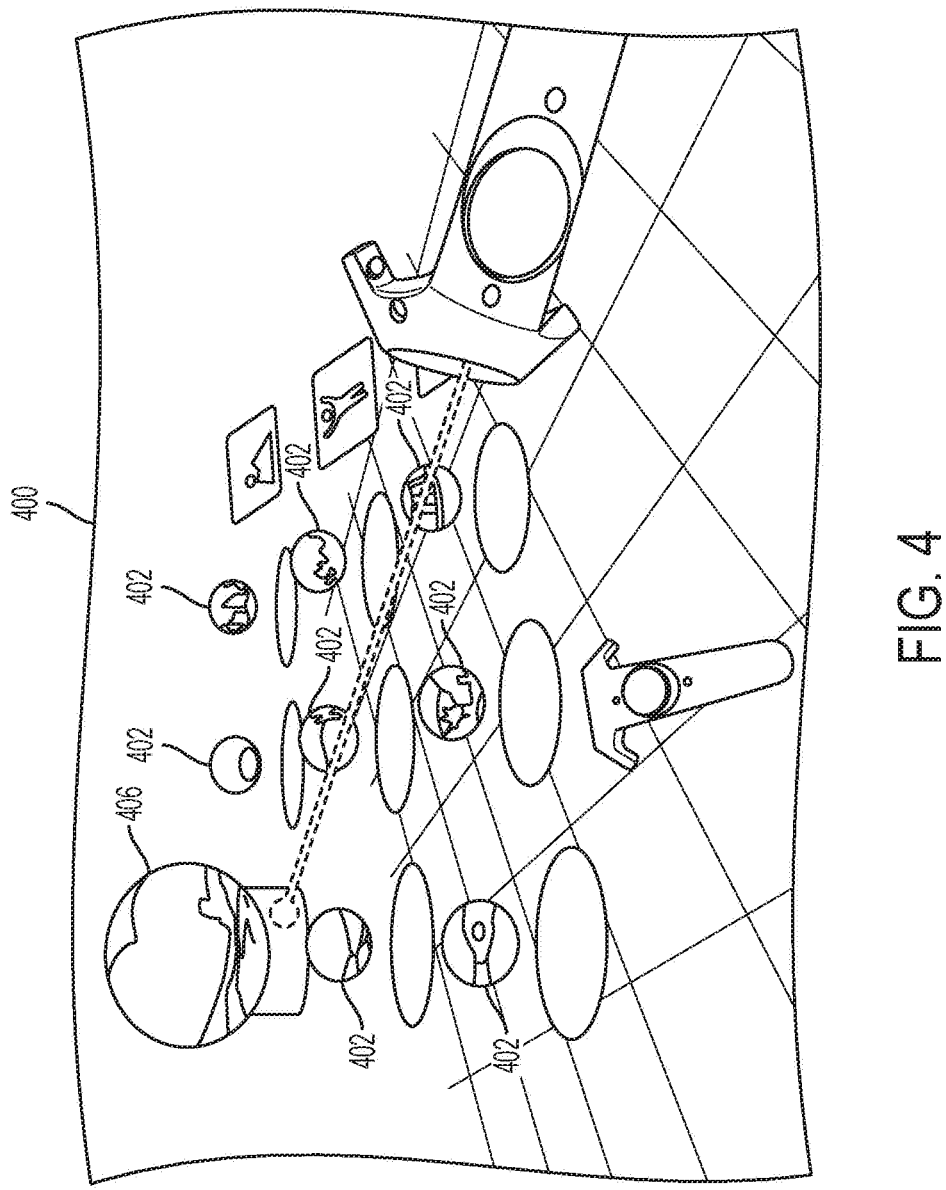
FIG. 4 illustrates an editing scene presented to a user including options for virtual scenery themes selectable by the user, in accordance with one or more implementations.

FIG. 4 illustrates an editing scene 400 presented to a user including options 402 for virtual scenery themes selectable by the user. Editing scene 400 may be presented by a display the same as or similar to display 16. The user may interact with the editing scene and/or select one or more options within the editing scene via one or more input controls 404. Editing scene 400 may represent the virtual space in which the user's presence is simulated. The editing scene 400 may be virtual reality content presented to the user via a display (e.g., a head mounted display and/or other display).

Editing scene 400 may present options 402 for virtual scenery themes. The user may be able to select a virtual scenery theme 406 to apply to the virtual space for the compiled virtual reality scene. Responsive to the user selecting the virtual scenery theme 406 to apply to the virtual space, the virtual scenery theme 406 may be applied to the virtual space. By way of non-limiting example, virtual scenery theme 406 may include a desert such that applying virtual scenery theme 406 includes presenting a desert virtual reality content such that the user's presence within the desert is simulated.

Returning to FIG. 1, selection component 24 may be configured to receive selection of one or more characters to virtually embody within the virtual space. Selection of the one or more characters to virtually embody may be input by the one or more users via user interface 14. Virtually embodying a character within the virtual space may include experiencing the virtual space as the character. Experiencing the virtual space as the character may include, for example, viewing the virtual space from the perspective of the character, moving within the virtual space as the character, interacting with the virtual space and/or other characters within the virtual space as the character, controlling the character's actions within the virtual space by performing the actions in real world physical space, and/or otherwise embodying the character within the virtual space. Virtually embodying a character may enable a user to record the motion and/or the sound made by the character within the compiled virtual reality scene.

In some implementations, selection of a first character to virtually embody within the virtual space may be received by selection component 24. Responsive to receiving selection of the first character by the selection component 24, the system may enable the first user to record the motion and/or the sound to be made by the first character within the compiled virtual reality scene. Selection of the first character may be received by selection component 24 from one or more input controls associated with user interface 14.

Selection component 24 may be configured to receive selection of a second character for a user virtually embody. The second character may be separate and distinct from the first character. Virtually embodying the second character may enable a first user or another user to record one or more of the motion, the sound, and/or other actions to be made by the second character within the compiled virtual reality scene. In some implementations, selection of the second character may be received by selection component 24 after first motion capture information characterizing the motion, the sound, and/or the other actions made by the first user as the first user virtually embodies the first character is recorded. In some implementations, selection of the second character is received from a second display for a second computing device associated with a second user. The second motion capture information may characterize the motion, sound, and/or other actions made by the second user. The second user may be a different user than the first user. A first computing device associated with a first user may be separate and distinct from a second display for a second computing device associated with a second user.

In some implementations, selection component 24 may be configured to receive selection of a third character for a user to virtually embody. The third character may be separate and/or distinct from the first character, the second character, and/or other characters within the editing scene and/or the compiled virtual reality scene. Virtually embodying the third character may enable the first user or a different user to record one or more of the motion, the sound, and/or other actions to be made by the third character within the compiled virtual reality scene. By way of non-limiting example, the actions manifested within the compiled virtual reality scene by one, two, or all three of the first character, the second character, and/or third character may correspond to the actions of one user, two different users, three different users, and/or any number of different users. In some implementations, the first computing device and the second computing device may be physically located in different locations such that information indicating portions of the compiled virtual reality scene must be transmitted over a network to one or more server(s) 40, one or more computing device(s) 12, and/or external resources 300.

In some implementations, selection component 24, may be configured to individually receive selection of any number of characters for a user and/or multiple users to virtually embody individually and/or together. Motion capture information may be recorded for the any number of characters such that the compiled virtual reality scene may include any number of animated characters (e.g., two or more, three or more, four or more, five or more, "n" or more, etc.) manifesting the motions, sounds, and/or other actions of the user and/or multiple users.

One or more users may create the virtual space depicted in the compiled virtual reality scene by selecting, placing, and/or modifying virtual reality content items within the virtual space. The virtual reality content items may include one or more characters, virtual objects, virtual scenery themes, virtual scenery items, and/or other virtual reality content items. The characters may include virtual characters within a virtual space, virtual objects, virtual creatures, and/or other characters. For example, the characters may include avatars and/or any other character(s). A compiled virtual reality scene may include multiple animated characters (e.g., two or more, three or more, four or more, five or more, "n" or more, etc.). The characters may be animated, partially animated, reflections of the users, live action, and/or other types of characters. The characters may be animated based on motion capture information corresponding to the motions, sounds, and/or actions made by one or more users. The one or more users may place and/or select avatars in the virtual space and initiate recording of their motions and/or sounds for individual avatars that are to be manifested by the individual avatars in the compiled scene. The individual motion capture recordings of the one or more users may correspond to individual avatars. The individual motion capture recordings may be recorded asynchronously (e.g., one-at-a-time, etc.).

Some of the individual motion capture recordings may not be captured asynchronously. The motion capture recordings for some of the characters to be animated within a compiled virtual reality scene may be captured together, and/or other motion capture recordings for other characters to be animated contemporaneously within the same compiled virtual reality scene may be captured asynchronously. By way of non-limiting example, two or more of the individual motion capture recordings for one or more characters to be animated within a compiled virtual reality scene may be captured together and/or at the same time. Another individual motion capture recording for another character may be captured at a different time and/or separately.

In some implementations, selection component 24 may be configured to receive selection of one or more characters, virtual objects, virtual scenery themes, virtual scenery items, and/or characters for placement within the editing scene. The arrangement one or more virtual objects, virtual scenery themes, virtual scenery items, and/or characters within the editing scene may be reflected in one or more segments of the compiled virtual reality scene. In some implementations, responsive to one or more characters being placed within the editing scene, the selection component 24 may be configured to receive selection of an individual character the user chooses to virtually embody.

Figure 5:
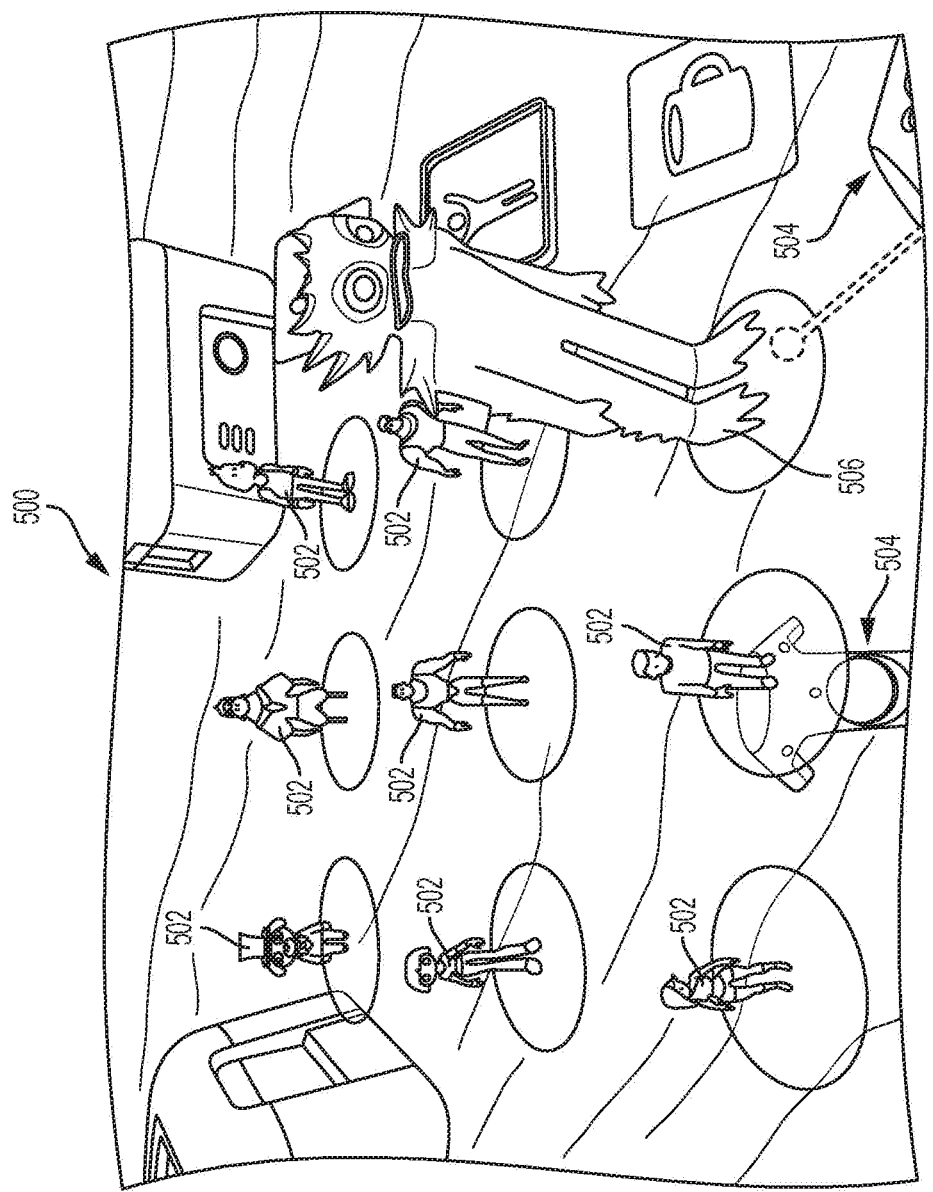
FIG. 5 illustrates an editing scene presented to a user including options for characters a user may place within editing scene, in accordance with one or more implementations.

FIG. 5 illustrates an editing scene 500 presented to a user including options for characters 502 a user may place within editing scene 500, in accordance with one or more implementations. Editing scene 500 may be presented by a display the same as or similar to display 16. The user may interact with the editing scene and/or select one or more options within the editing scene via one or more input controls 504. Editing scene 500 may represent the virtual space in which the user's presented is simulated. Editing scene 500 may be virtual reality content presented to the user via a display (e.g., a head mounted display and/or other display).

Editing scene 500 may present options for characters 502 that may be placed within the editing scene. The user may be able to select one or more characters 502 to place within the editing scene and/or to be reflected in the compiled virtual reality scene. Responsive to the user selecting avatar 506, the user may be able to place avatar 506 within the editing scene. By way of non-limiting example, avatar 506 may include an alien.

Figure 6:
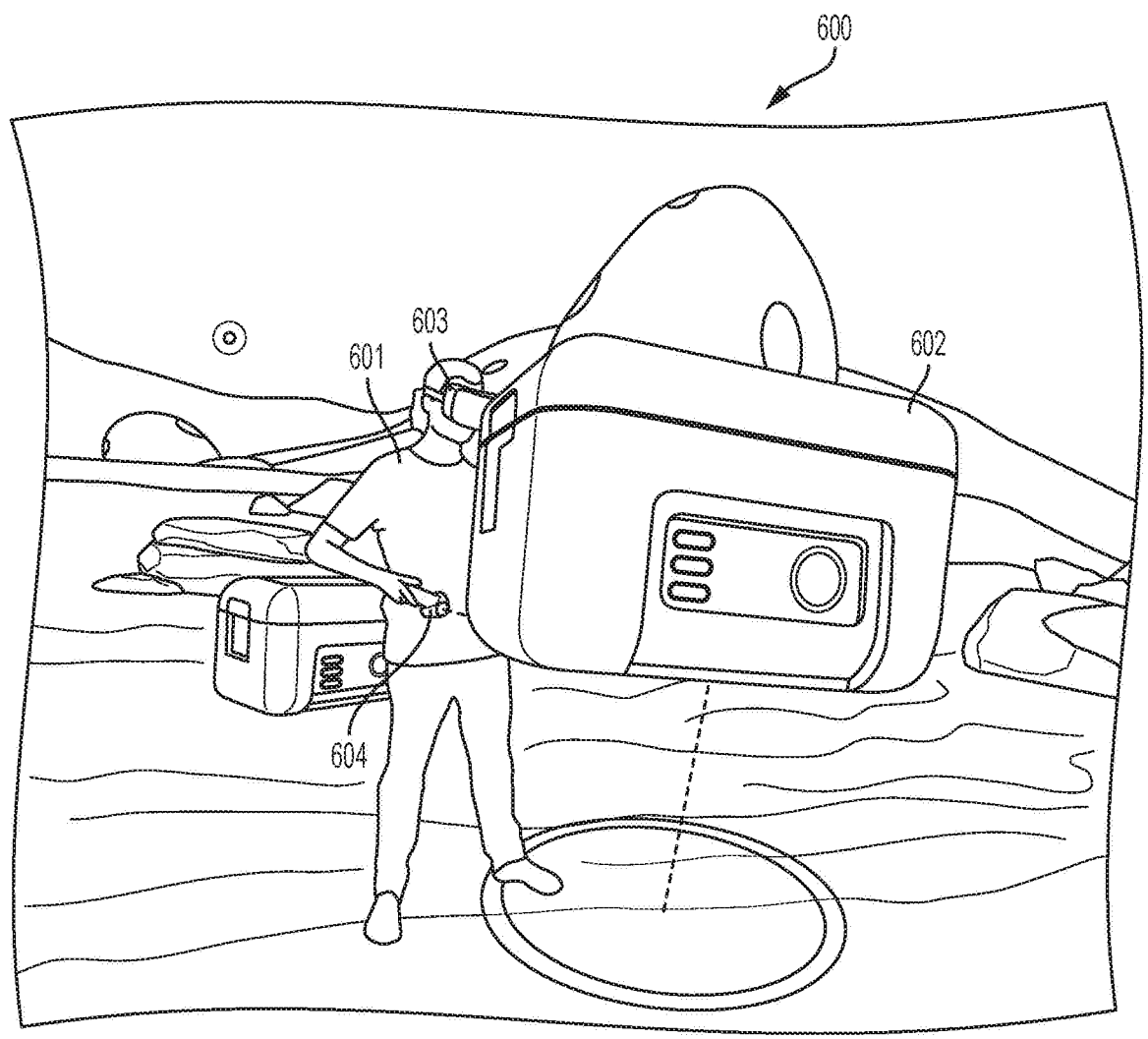
FIG. 6 illustrates an editing scene presented to a user responsive to the user selecting a virtual object, in accordance with one or more implementations.

FIG. 6 illustrates an editing scene 600 presented to user 601 responsive to user 601 selecting virtual object 602, in accordance with one or more implementations. Editing scene 600 may be presented by display 603 (e.g., the same as or similar to display 16). User 601 may interact with editing scene 600 and/or control the placement of virtual object 602 via one or more input controls 604. Editing scene 600 may represent the virtual space in which the user's 601 presence is simulated. Editing scene 600 may be virtual reality content presented to user 601 via display 603 (e.g., a head mounted display and/or other display). Editing scene 600 may enable a user 601 to move object 602 to a user dictated location within editing scene 600. By way of non-limiting example, object 602 include a prop to be presented within the compiled virtual reality scene.

Figure 7A:
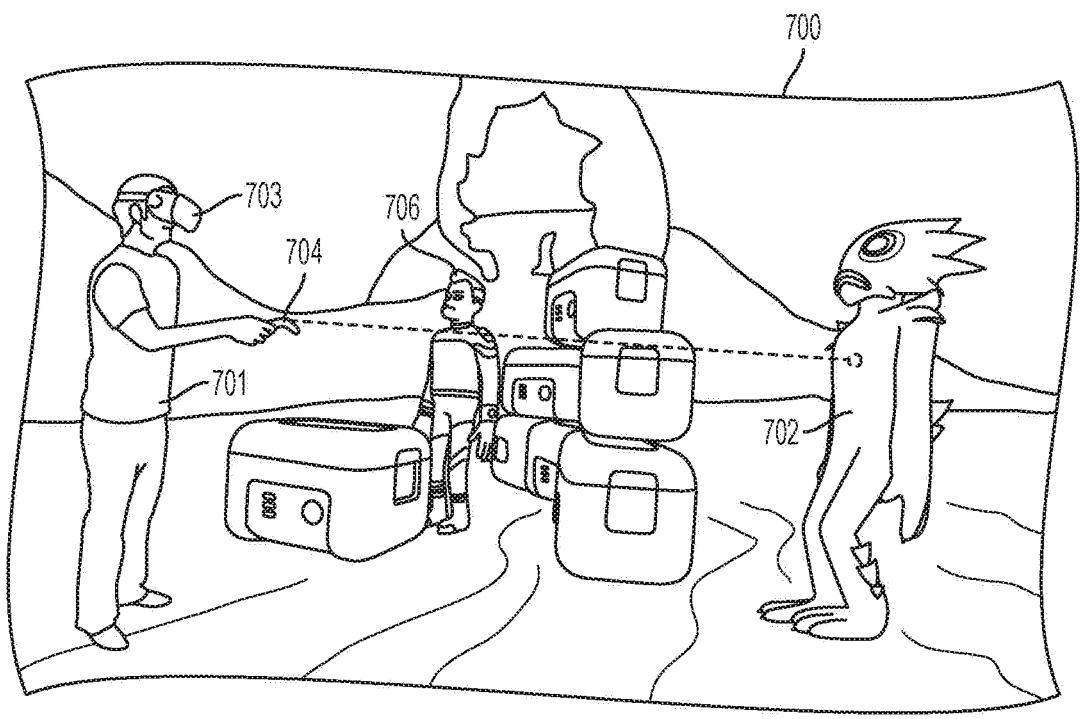
FIG. 7A illustrates an editing scene in which a user selects a character to virtually embody, in accordance with one or more implantations.
Figure 7B:
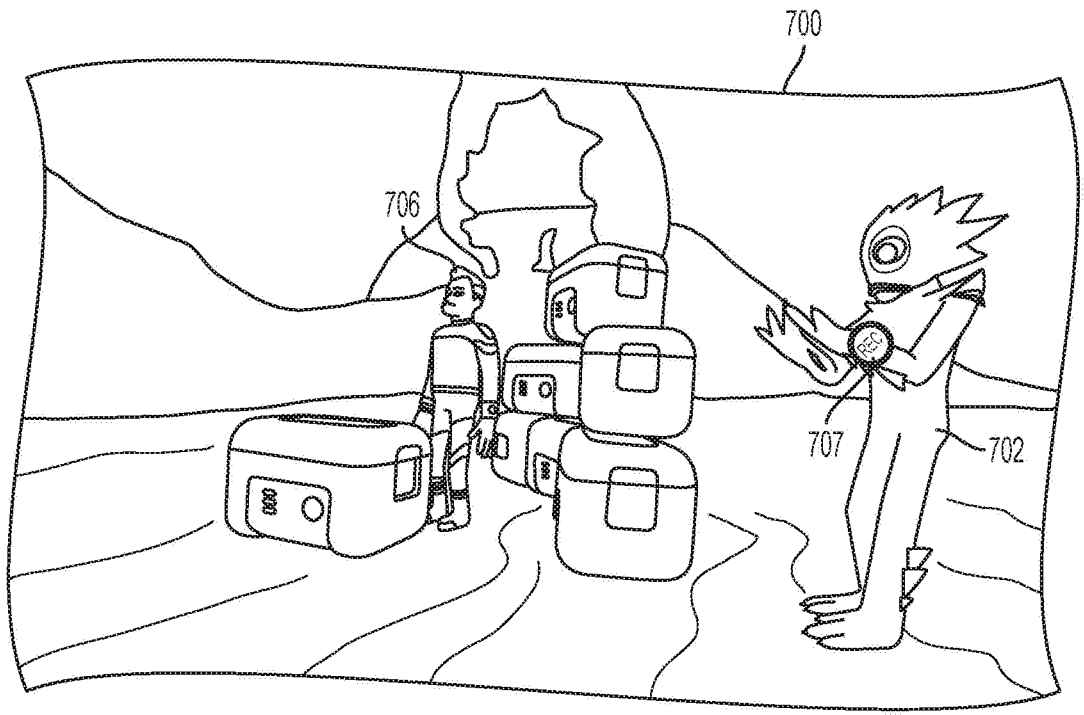
FIG. 7B illustrates an editing scene wherein user is virtually embodying a character, in accordance with one or more implantations.

FIG. 7A illustrates editing scene 700 in which user 701 selects character 702 to virtually embody, in accordance with one or more implantations. FIG. 7B illustrates editing scene 700 wherein user 701 is virtually embodying character 702, in accordance with one or more implantations. Editing scene 700 may be presented via display 703 the same as or similar to display 16. User 701 may select character 702 to virtually embody via one or more input controls 704. Editing scene 700 may represent the virtual space in which the user's presence is simulated. Editing scene 700 may include virtual reality content presented to the user via display 703 (e.g., a head mounted display and/or other display).

Editing scene 700 may include other character(s) 706 in addition to character 702 from which user 701 may select to virtually embody. As illustrated in FIG. 7B, responsive to user 701 selecting character 702 to virtually embody, user 701 may be able to experience the virtual space as character 702. Editing scene 700 may include a recording option (e.g., "REC" button, etc.) 707 that may be selected by user 701 to initiate recording of motion capture information reflecting the motion, sound, and/or other actions made by user 701 to be manifested by character 702 within a compiled virtual reality scene.

Returning to FIG. 1, selection component 24 may be configured to receive of a facial expression for one or more of the characters. As such, the motion capture information may include one or more facial expressions for the characters. The facial expressions may be timed and/or selected to correspond with the motions, the sound, and/or other actions performed by the user. In some implementations, selection component 24 may be configured to receive selection of a first facial expression for the first character. The first motion capture information may include the first facial expression for the first character. As such, one or more of the actions of the first user may be manifested in the compiled virtual reality scene by the first character with the first facial expression.

In some implementations, other expressions, motions, and/or actions for one or more other portions of the character may be selected by one or more users and/or received by selection component 24. The other expressions, motions, and/or actions for other portions of one or more of the characters may be manifested in the compiled virtual reality scene. The other expressions, motions, and/or other actions may be selected for one or more of the body, hands, feet, eyes, face, mouth, toes, and/or other portions of one or more of the characters. In some implementations, the motion capture information may include motion capture information recorded by a user as the user virtually embodies one or more of the characters, and/or motion capture information selected via one or more user controls and/or the editing scene (e.g., separate from the users' virtual embodiment of the character). The motion capture information selected via the editing scene may include selected expressions, motions, and/or actions for one or portions of individual characters received by selection component 24. By way of non-liming example, the user may be able to select one or more of other expressions, motions, and/or actions for one or more portions of one or more of the characters by using their thumbs and/or fingers to control user input controls to make selections.

Figure 8:
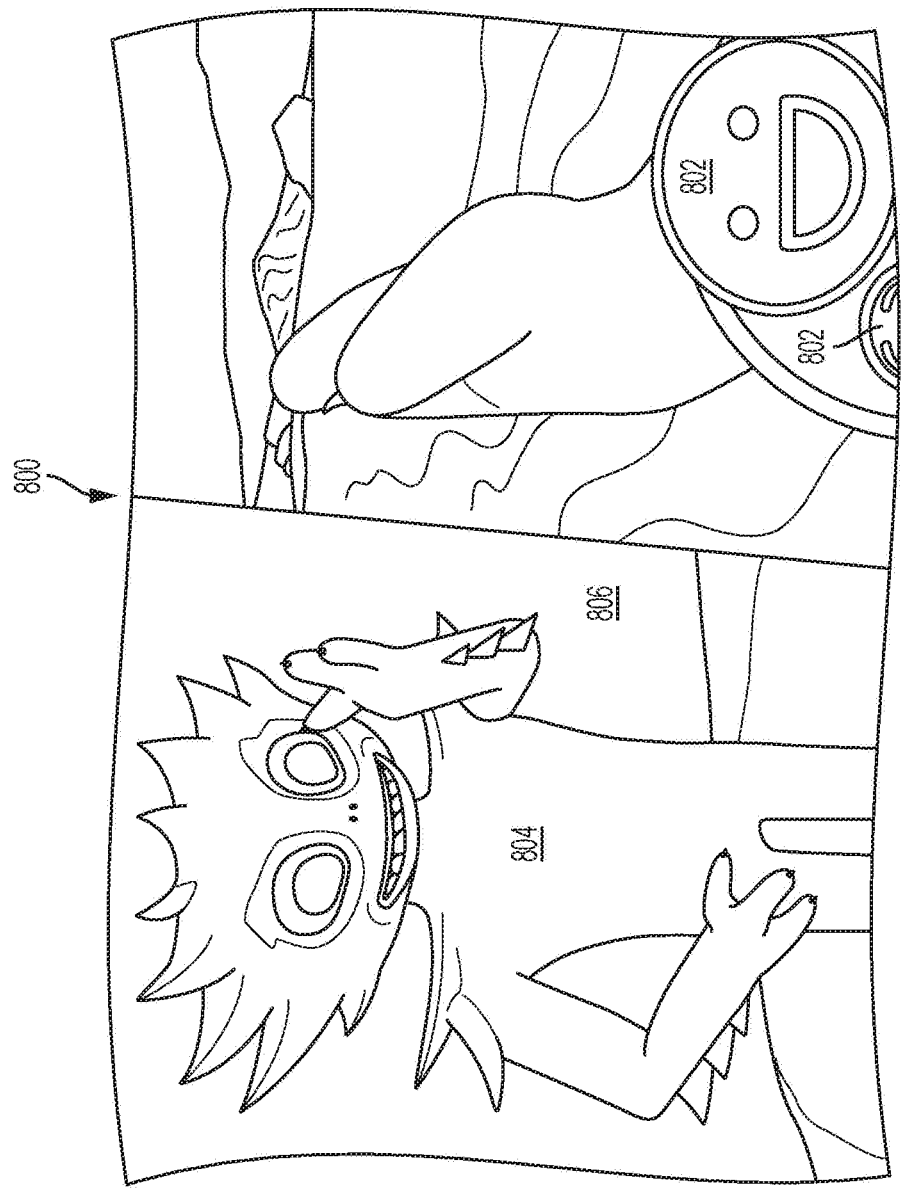
FIG. 8 illustrates an editing scene wherein a user is presented with facial expression options for a character, in accordance with one or more implementations.

FIG. 8 illustrates editing scene 800 wherein a user is presented with facial expression options 802 for character 804, in accordance with one or more implementations. Responsive to the user selecting facial expression 801, facial expression 801 may be reflected by character 804 while character 804 manifests the actions of user within the compiled virtual reality scene. In some implementations, a virtual reflective surface 806 may be presented within the virtual space such that the user is able to preview and/or view the facial expression selected. By way of non-limiting example, the user may select facial expression 801 to be reflected by character 804 for the portion of the scene prior to requesting to capture the motion and/or the sound for character 804 based on the motion and/or sound made by the user while virtually embodying character 804. User input controls (not pictured) may be used to make one or more selections within editing scene 800. By way of non-liming example, the user may be able to select one or more of the facial expression options 802 by using their thumbs and/or fingers to control the user input controls and select one or more the facial expression options 802.

Motion capture component 26 may be configured to receive requests to capture the motion, the sound, and/or other actions for one or more characters. The requests may be to capture the motion, the sound, and/or other actions to be manifested within the compiled virtual reality scene by the one or more characters. A request to capture the motion, sound, and/or other action for a character may initiate recording of the motion, sound, and/or other actions of a user to be manifested by the character within the compiled virtual reality scene. Motion capture component 26 may be configured to record motion capture information characterizing the motion, the sound, and/or other actions made by a user as the user virtually embodies a character. Motion capture component 26 may record the motion capture information based on the output signals generated by the sensors.

In some implementations, motion capture component 26 may receive a first request to capture the motion, the sound, and/or other actions for the first character; a second capture request to capture the motion, the sound, and/or other actions for the second character, a third request to capture motion, the sound, and/or other actions for the third character; and/or another request to capture the motion, sound, and/or other actions for other characters.

Motion capture component 26 may be configured to record first motion capture information characterizing the motion, the sound, and/or other actions made by the first user as the first user virtually embodies the first character. The first motion capture information may be captured in a manner such that the actions of the first user may be manifested by the first character within the compiled virtual reality scene. Motion capture component 26 may be configured to receive a second request to capture the motion, the sound, and/or other actions for the second character. By way of non-limiting example, the second request may be received after the first motion capture information is recorded. In some implementations, the second request to capture the motion, the sound, and/or other action for the second character may be responsive to receiving selection of the second character for the user to virtually embody.

Motion capture component 26 may be configured to record second motion capture information. The second motion capture information may characterize the motion, the sound, and/or the other actions made by the first user or another user as the first user or the other user virtually embodies the second character. The second motion capture information may be captured in a manner such that the actions of the first user or the other user are manifested by the second character within the compiled virtual reality scene. The actions of the first user or the other user may be manifested by the second character within the compiled virtual reality scene contemporaneously with the actions of the first user manifested by the first character within the compiled virtual reality scene. By way of non-limiting example, the first character, the second character, and/or other characters may appear to interact with each other and/or react to occurrences (e.g., actions by one or more characters, and/or other occurrences within the virtual space) performed within the same compiled virtual reality scene.

In some implementations, the motion capture component 26 may be configured to capture sound and/or motion for a given character separately. For example, sound and/or voice information may be added to animated characters after their motion has been recorded. By way of non-limiting example, a first user may record the motion for the first character and/or a second user may (e.g., asynchronously) record the sound for the first character.

In some implementations, responsive to motion capture component 26 receiving the second request to capture the motion, the sound, and/or other actions for the second character, the editing scene may be presented to the first user or the other user. The editing scene may include a manifestation of the first user's actions by the first character presented contemporaneously to the first user or the other user while the second motion capture information is being recorded. One or more display(s) 16 and/or computing device(s) 12 may be configured to configured to present the editing scene including one or more manifestations of one or more users' actions by one or more characters based on previously recorded motion capture information while recording subsequent motion capture information characterizing the motion and/or the sound made by the users as the users virtually embody one or more characters.

Figure 9:
FIG. 9 illustrates an editing scene depicting a manifestation of a user's previous actions by a first character, in accordance with one or more implementations.

FIG. 9 illustrates an editing scene 900 depicting a manifestation of a user's previous actions by first character 902, in accordance with one or more implementations. The manifestation of a user's previous actions by first character 902 may be based on previously recorded motion capture information may be presented to user 904 while user 904 is virtually embodying a second character 906 (not illustrated) and/or recording second motion capture information that characterizes the motion and the sound made by user 904 to be manifested by second character 906 in the compiled virtual reality scene contemporaneously with first character 902. User 904 may be able to see, react to, and/or otherwise interact with previously recorded first character 902 while recording second character 906 that user 904 is virtually embodying. User 904 may be able to view previously recorded first character 902 via a display 908. User input controls 910 may be used to make one or more selections within editing scene 900.

Returning to FIG. 1, the same user that virtually embodied the first character and/or initiated recording of the first motion capture information for the first character based on their actions, may be the user that virtually embodies the second character and/or initiates recording of the second motion capture information for the second character based on their actions. In some implementations, the user that virtually embodied the first character and/or initiated recording of the first motion capture information for the first character based on their actions, may be a different user than the other user that virtually embodies the second character and/or initiates recording motion capture information for the second character based on his actions.

In some implementations, a third request to capture the motion, the sound, and/or other actions for the third character may be received by motion capture component 26. Motion capture component 26 may be configured to record third motion capture information. The third motion capture information may characterize the motion, the sound, and/or other actions made by the first user or the different user as the first user or the different user virtually embodies the third character. The third motion capture information may be captured in a manner such that the actions of the first user or the different user are manifested by the third character contemporaneously with the actions of the first user manifested by the first character, the actions of the first user or the other user manifested by the second character, and/or the actions of another user manifested by another character within the compiled virtual reality scene.

In some implementations, first motion capture information may characterize the motion or the sound made by the first user, the second motion capture information may characterize the motion and/or the sound made by the second user, and/or the third motion capture information may characterize the motion and/or the sound made by the first user. In some implementations, the first motion capture information may characterize the motion or the sound made by the first user, the second motion capture information may characterize the motion and/or the sound made by a second user, and/or the third motion capture information may characterize the motion and/or the sound made by a third user.

The first user, the second user, and/or the third user may be different. In some implementations, the first user, the second user, and/or the third user may be are associated with different computing devices located at different physical locations. In some implementations, the motion, sound, and/or other actions of three or more users may be captured and/or manifested by any number of characters within the compiled virtual reality scene.

By way of non-limiting example, recording of the first motion capture information may take place in one part of the world and/or be uploaded for sharing (e.g., via the cloud/ server, etc.). Continuing the non-limiting use example, the second motion capture information may be recorded based on the motions, sounds, and/or actions of another user, who reacts to the first motion capture information. The second motion capture information may be recorded in response to the other user obtaining the recording of the first motion capture information via the could/server. The second motion capture information may be shared via the cloud/server, etc.

Scene generation component 28 may be configured to generate the compiled virtual reality scene. The compiled virtual reality scene may include animation of the first character, the second character, the third character, and/or other characters. The compiled virtual reality scene may be generated such that the first character, the second character, the third character, and/or other characters appear animated within the compiled virtual reality scene contemporaneously. As such, the motion, sound, and/or other actions for the different characters within a given compiled virtual reality scene may be recorded asynchronously, but still appear animated within the compiled virtual reality scene contemporaneously (e.g., according to the same timeline, etc.). As such, asynchronously recorded characters may appear to interact with each other and/or react to each other, even though the characters' actions may be recorded independently, separately, one at a time, with different computing devices, by different users, and/or at different physical locations.

In some implementations, a user may be able to select when (e.g., a point in time, a time period, etc.) within, the compiled virtual reality scene, their actions will be manifested by a given character. As such, returning to selection component 24, selection of a start time within a timeline of the compiled scene may be received. The start time within the timeline of the compiled scene may indicate when the first character should start manifesting the actions of the first user within the compiled virtual reality scene during playback of the compiled virtual reality scene. As such, the timing of the second characters reactions, interaction, motion, sound, and/or other actions may be dictated by one or more users (e.g., the users performing the motion capture, a director organizing multiple users performing the motion capture for different characters within the compiled virtual reality scene, and/or other users).

In some implementations, a user may be able to change the timing, physical placement, scale, and/or other attributes of the motion capture information, the compiled virtual reality scene, and/or one or more characters and/or objects within the editing scene and/or the compiled virtual reality scene. Selection component 24 may be configured to receive selection of one or more changes to one or more portions of the motion capture information and/or the compiled virtual reality scene from one or more users.

The compiled virtual reality scene, and/or portions of the compiled virtual reality scene may be transmitted to one or more computing devices associated with one or more users for viewing, adding one or more characters, editing one or more characters, adding and/or editing the virtual objects, adding and/or editing a virtual scenery theme, and/or for other reasons. In some implementations, one or more users may be able to asynchronously create and/or define differential two-dimensional portions, three-dimensional and/or 360 portions, and/or media content items from the compiled virtual reality scene. The created and/or defined portions may be transmitted to one or more computing devices for viewing, sharing, editing, and/or for other reasons.

In some implementations, an editor of the compiled virtual reality scene may control and/or dictate which users may add to, contribute to, edit, view, and/or otherwise interact with the compiled virtual reality scene. By way of non-limiting example the editor may assign one or more users to perform the motion capture recordings for one or more characters to be animated within the compiled virtual reality scene. In some implementations, the first user may record and/or indicate companion instructions and/or directions for subsequent users re what they should do and/or record in the scene.

The compiled virtual reality scene may be shared, transmitted, hosted online, and/or otherwise communicated to one or more computing device(s) 12 for viewing by one or more users via one or more display(s) 16. The presence of one or more users viewing the compiled virtual reality scene may be simulated within the compiled virtual reality scene. As such, for example, the one or more users may be able to look around, move around, walk-through, run-through, and/or otherwise view and/or interact with the compiled virtual reality scene.

Figure 10:
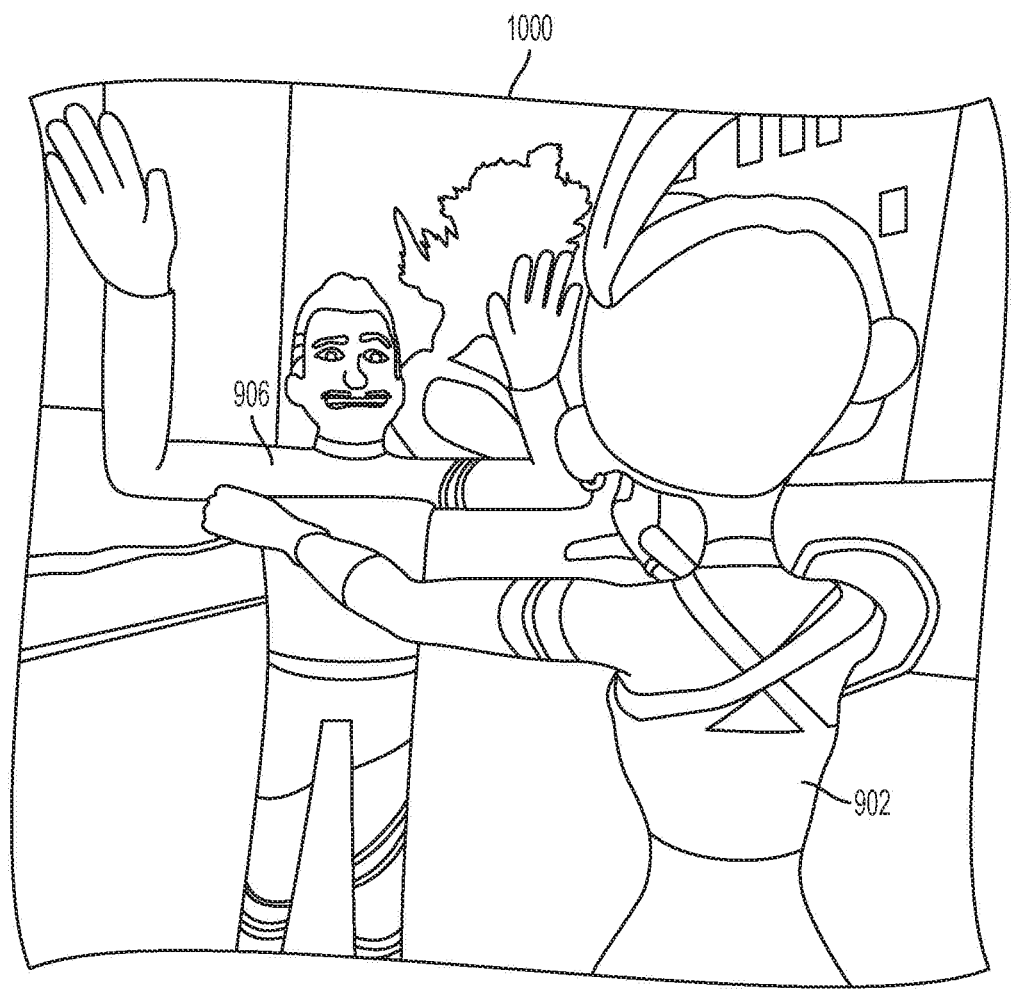
FIG. 10 illustrates a compiled virtual reality scene, in accordance with one or more implementations.

FIG. 10 illustrates a compiled virtual reality scene 1000, in accordance with one or more implementations. Compiled virtual reality scene 1000 may include animation of the first character 902, second character 906, and/or other characters. First character 902, second character 906, and/or other characters may appear animated within compiled virtual reality scene 1000 contemporaneously. In some implementations, the motion, sound, and/or other actions of first character 902 may be based on first motion capture information. The motion, sound, and/or other actions of second character intersects may be based on second motion capture information. In some implementations, the first motion capture information and the second motion capture information may be recorded and/or captured asynchronously, be recorded by different computing devices located at one or more physical locations, characterize the motion and/or sound made by the same user, and/or characterize the motion and/or sound made by different users.

Returning to FIG. 1, sensors 18 may be configured to generate output signals conveying information related to motion, sounds, view direction, location, and/or other actions of the user and/or other information. The view direction of the user may correspond to a physical direction toward which a gaze of the user is directed, an orientation of one or more parts of the user's body (e.g., the user's head may be tilted, the user may be leaning over), a position of a user within the virtual space, and/or other directional information. The information related to motion, sounds, and/or other actions of the user may include any motion capture information they may be captured in accordance with existing and/or future methods. These examples are not intended to be limiting. In some implementations, sensors 18 may include one or more of a GPS sensor, a gyroscope, an accelerometer, an altimeter, a compass, a camera based sensor, a magnetic sensor, an optical sensor, an infrared sensor, a motion tracking sensor, an inertial sensor, a CCB sensor, an eye tracking sensor, a facial tracking sensor, a body tracking sensor, and/or other sensors.

User interface 14 may be configured to provide an interface between system 10 and the user through which the user may provide information to and receive information from system 10. This enables data, cues, results, and/or instructions and any other communicable items, collectively referred to as "information," to be communicated between the user and system 10. By way of a non-limiting example, user interface 14 may be configured to display the virtual reality content to the user. Examples of interface devices suitable for inclusion in user interface 14 include one or more controllers, joysticks, track pad, a touch screen, a keypad, touch sensitive and/or physical buttons, switches, a keyboard, knobs, levers, a display (e.g., display 16), speakers, a microphone, an indicator light, a printer, and/or other interface devices. In some implementations, user interface 14 includes a plurality of separate interfaces (e.g., multiple displays 16). In some implementations, user interface 14 includes at least one interface that is provided integrally with processor 20. In some implementations, user interface 14 may be included in computing device 12 (e.g., a desktop computer, a laptop computer, a tablet computer, a smartphone, a virtual reality headset, etc.) associated with an individual user. In some implementations, user interface 14 may be included in a first computing device (e.g., a virtual reality headset) that is located remotely from a second computing device (e.g., server 40 shown in FIG. 3).

It is to be understood that other communication techniques, either hard-wired or wireless, are also contemplated by the present disclosure as user interface 14. For example, the present disclosure contemplates that user interface 14 may be integrated with a removable storage interface provided by electronic storage 30. In this example, information may be loaded into system 10 from removable storage (e.g., a smart card, a flash drive, a removable disk) that enables the user to customize the implementation of system 10. Other exemplary input devices and techniques adapted for use with system 10 as user interface 14 include, but are not limited to, an RS-232 port, RF link, an IR link, modem (telephone, cable or other), a USB port, Thunderbolt, a Bluetooth connection, and/or other input devices and/or techniques. In short, any technique for communicating information with system 10 is contemplated by the present disclosure as user interface 14.

Display 16 may be configured to present the virtual reality content to the user. Display 16 may be configured to present the virtual reality content to the user such that the presented virtual reality content corresponds to a view direction of the user. Display 16 may be controlled by processor 20 to present the virtual reality content to the user such that the presented virtual reality content corresponds to a view direction, location, and/or physical position of the user. Display 16 may include one or more screens, projection devices, three dimensional image generation devices, light field imaging devices that project an image onto the back of a user's retina, virtual reality technology that utilizes contact lenses, virtual reality technology that communicates directly with (e.g., transmitting signals to and/or receiving signals from) the brain, and/or other devices configured to display the virtual reality content to the user. The one or more screens and/or other devices may be electronically and/or physically coupled, and/or may be separate from each other. As described above, in some implementations, display 16 may be included in a virtual reality headset worn by the user. In some implementations, display 16 may be a single screen and/or multiple screens included in a computing device 12 (e.g., a cellular telephone, a smartphone, a laptop, a tablet computer, a desktop computer, a television set-top box/television, smart TV, a gaming system, a virtual reality headset, and/or other devices). In some implementations, display 16 may include a plurality of screens physically arranged about a user such that when a user looks in different directions, the plurality of screens presents individual portions (e.g., that correspond to specific view directions and/or fields of view) of the virtual reality content to the user on individual screens.

Processor 20 may be configured to provide information processing capabilities in system 10. Processor 20 may communicate wirelessly with user interface 14, sensors 18, electronic storage 30, external resources not shown in FIG. 1, and/or other components of system 10. In some implementations, processor 20 may communicate with user interface 14, sensors 18, electronic storage 30, external resources not shown in FIG. 1, and/or other components of system 10 via wires. In some implementations, processor 20 may be remotely located (e.g., within server 40 shown in FIG. 3) relative to user interface 14, sensors 18, electronic storage 30, external resources not shown in FIG. 1, and/or other components of system 10.

Processor 20 may be configured to execute computer program components. The computer program components may be configured to enable an expert and/or user to interface with system 10 and/or provide other functionality attributed herein to user interface 14, sensors 18, electronic storage 30, and/or processor 20. The computer program components may include a display component 22, a selection component 24, a motion capture component 26, a scene generation component 28, and/or other components.

Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may comprise a plurality of processing units. These processing units may be physically located within the same device (e.g., a server, a desktop computer, a laptop computer, a tablet computer, a smartphone, a virtual reality headset, and/or other computing devices), or processor 20 may represent processing functionality of a plurality of devices operating in coordination (e.g., a plurality of servers, a server and a computing device 12). Processor 20 may be configured to execute components 22, 24, 26, and/or 28 by software; hardware; firmware; some combination of software, hardware, and/or firmware; and/or other mechanisms for configuring processing capabilities on processor 20.

It should be appreciated that although components 22, 24, 26, and 28 are illustrated in FIG. 1 as being co-located within a single processing unit, in implementations in which processor 20 comprises multiple processing units, one or more of components 22, 24, 26, and/or 28 may be located remotely from the other components (e.g., such as within server 40 shown in FIG. 3). The description of the functionality provided by the different components 22, 24, 26, and/or 28 described herein is for illustrative purposes, and is not intended to be limiting, as any of components 22, 24, 26, and/or 28 may provide more or less functionality than is described. For example, one or more of components 22, 24, 26, and/or 28 may be eliminated, and some or all of its functionality may be provided by other components 22, 24, 26, and/or 28. As another example, processor 20 may be configured to execute one or more additional components that may perform some or all of the functionality attributed below to one of components 22, 24, 26, and/or 28. In some implementations, one or more of components 22, 24, 26, and/or 28 may be executed by a processor incorporated in a remotely located server, and/or other components of system 10.

Electronic storage 30 may comprise electronic storage media that electronically stores information. The electronic storage media of the electronic storage may include one or both of storage that is provided integrally (i.e., substantially non-removable) with the respective device and/or removable storage that is removably connectable to the respective device. Removable storage may include for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage may store files, software algorithms, information determined by processor(s) 20, and/or other information that enables the respective devices to function as described herein.

Figure 11:
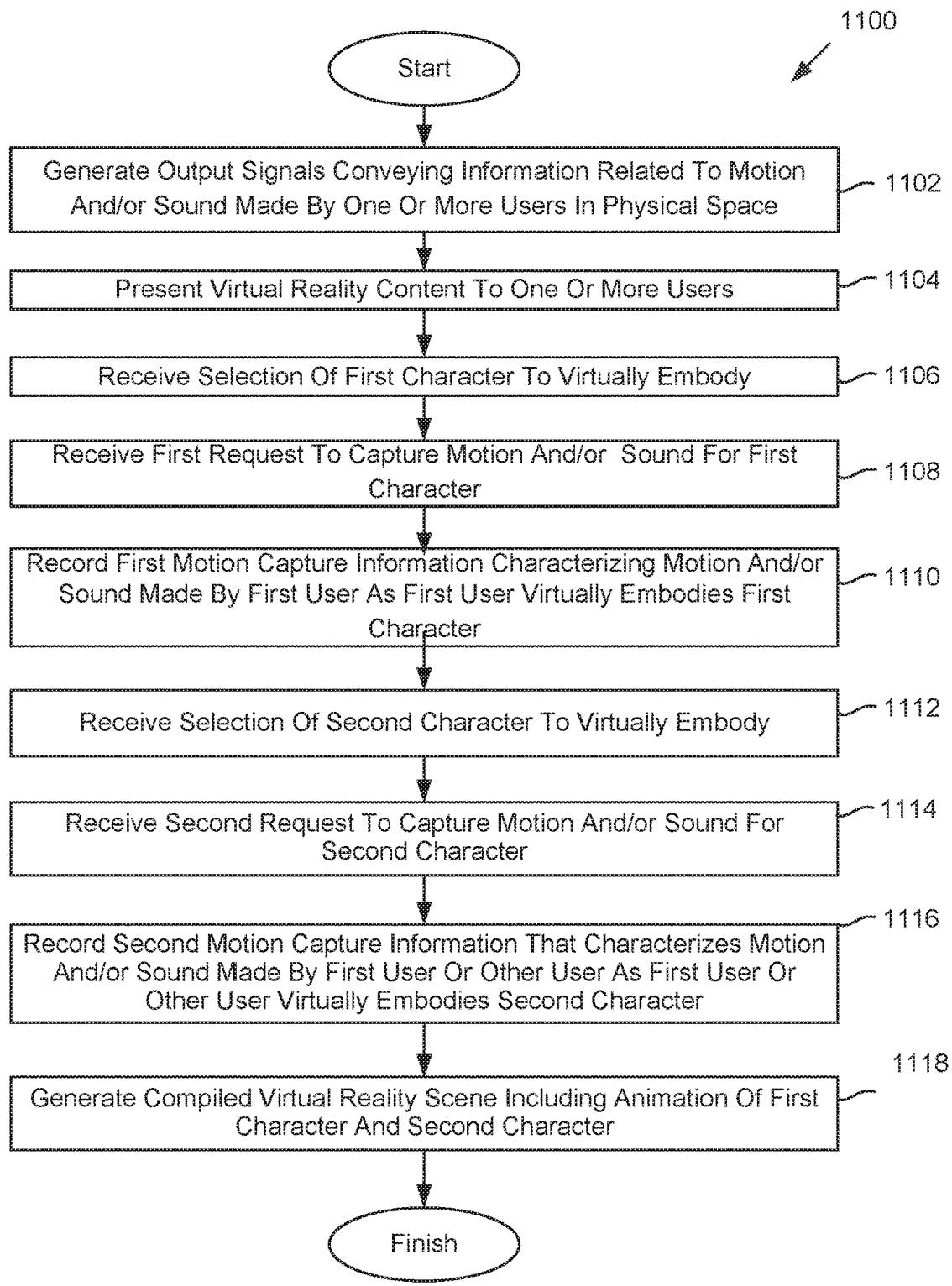
FIG. 11 illustrates an implementation of a method for animating characters based on motion capture, and/or for playing back individual asynchronous motion capture recordings as a compiled virtual reality scene, in accordance with one or more implementations.

FIG. 11 illustrates a method 1100 for animating characters based on motion capture, and/or for playing back individual asynchronous motion capture recordings as a compiled virtual reality scene, in accordance with one or more implementations. The operations of method 1100 presented below are intended to be illustrative. In some implementations, method 1100 may be accomplished with one or more additional operations not described, and/or without one or more of the operations discussed. Additionally, the order in which the operations of method 1100 are respectively illustrated in FIG. 11 and described below is not intended to be limiting.

In some implementations, method 1100 may be implemented by one or more computing devices, and/or in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

At an operation 1102, output signals may be generated. The output signals may convey information related motion, sound, and/or other actions made by one or more users in physical space. The sensors may be configured to capture the motion, the sound, and/or other actions made by the one or more users. In some implementations, operation 1102 may be performed by one or more sensors that are the same as or similar to sensors 18 (shown in FIG. 1 and described herein).

At an operation 1104, virtual reality content may be presented to one or more users. The virtual reality content may be presented via one or more displays. Presentation of the virtual reality content via display may simulate the presence of a user within a virtual space that is fixed relative to physical space. The one or more displays maybe. To present opted for recording the motion, the sound, and/or other actions for one or more of the characters within the virtual space. In some implementations, operation 1104 may be performed by a display that is the same as or similar to display 16 (shown in FIG. 1 and described herein).

At an operation 1106, selection of a first character to virtually embody within the virtual space may be received. Virtually embodying the first character may enable a first user to record the motion, the sound, and/or other actions to be made by the first character within the compiled virtual reality scene. Operation 1106 may be performed by selection component that is the same as or similar to selection component 24 (shown in FIG. 1 and described herein).

At an operation 1108, a first request to capture the motion, the sound, and/or other actions for the first character may be received. In some implementations, operation 1108 may be performed by a motion capture component that is the same as or similar to motion capture component 26 (shown in FIG. 1 and described herein).

At an operation 1110, first motion capture information may be recorded. The first motion capture information may characterize the motion, the sound, and/or other actions made by the first user as the first user virtually embodies the first character. The first motion capture information may be captured in a manner such that the actions of the first user are manifested by the first character within the compiled virtual reality scene. Operation 1110 may be performed by a motion capture component that is the same as or similar to motion capture component 26 (shown in FIG. 1 and described herein).

At an operation 1112, selection of a second character to virtually embody may be received. The second character may be separate and distinct from the first character. Virtually embodying the second character may enable the first user or another user to record one or more of the motion, the sound, and/or other actions to be made by the second character within the compiled virtual reality scene. Operation 1112 may be performed by a motion capture component the same as or similar to motion capture component 26 (shown in FIG. 1 and described herein).

At an operation 1114, a second request to capture the motion, the sound, and/or other actions for the second character may be received. Operation 1114 may be performed by a component the same as or similar to selection component 24 (shown in FIG. 1 and described herein).

At an operation 1116, second motion capture information may be recorded. The second motion capture information may characterize the motion, the sound, and/or other actions made by the first user or other user as the first user or the other user virtually embodies the second character. The second motion capture information may be captured in a manner such that the actions of the first user or the other user may be manifested by the second character contemporaneously with the actions of the first user manifested by the first character within the compiled virtual reality scene. Operation 1116 may be performed by a motion capture component the same as or similar to motion capture component 26 (shown in FIG. 1 and described herein).

At an operation 1118, the compiled virtual reality scene may be generated. The compiled virtual reality scene may include animation of the first character, the second character, and/or other characters such that the first character and the second character appear animated within the compiled virtual reality scene contemporaneously. Operation 1112 may be performed by a scene generation component the same as or similar to scene generation component 28 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. As another example, the present disclosure contemplates that technological advances in display technology such as light field imaging on the back of a retina, contact lens displays, and/or a display configured to communicate with (e.g., transmit signals to and/or receive signals from) a user's brain fall within the scope of this disclosure.

What is claimed is:

1. A system configured to generate and/or modify three-dimensional scenes comprising animated characters based on individual asynchronous motion capture recordings, the system comprising:

one or more sensors configured to generate output signals conveying information related to motion and/or sound made by one or more users in physical space, the sensors being configured to capture the motion and/or the sound made by the one or more users;

one or more displays that present virtual reality content to one or more users, wherein presentation of the virtual reality content via a display simulates presence of a user within a virtual space that is fixed relative to physical space;

one or more processors configured by machine-readable instructions to:

receive selection of a first character to virtually embody within the virtual space such that virtually embodying the first character enables a first user to record the motion and/or the sound to be made by the first character within the compiled virtual reality scene;

receive a first request to capture the motion and/or the sound for the first character;

record first motion capture information characterizing the motion and/or the sound made by the first user as the first user virtually embodies the first character, wherein the first motion capture information is captured in a manner such that actions of the first user are manifested by the first character within the compiled virtual reality scene;

receive selection of a second character to virtually embody, wherein the second character is separate and distinct from the first character, and wherein virtually embodying the second character enables the first user to record one or more of the motion and/or the sound to be made by the second character within the compiled virtual reality scene;

receive a second request to capture the motion and/or the sound for the second character, wherein responsive to receiving the second request to capture the motion and/or sound for the second character, a manifestation of the first user's actions by the first character is presented by the one or more displays to the first user;

contemporaneous to the presentation of the manifestation of the first user's actions by the first character, record second motion capture information that characterizes the motion and/or the sound made by the first user as reactions to the manifestation as the first user virtually embodies the second character, wherein the second motion capture information is captured in a manner such that actions of the first user are manifested by the second character contemporaneously with the actions of the first user manifested by the first character within the compiled virtual reality scene; and generate the compiled virtual reality scene including animation of the first character and the second character such that the first character and the second character appear animated within the compiled virtual reality scene contemporaneously.

2. The system of claim 1, wherein the one or more processors are further configured by machine-readable instructions to:

contemporaneous to receiving the selection of the second character, receive selection of a third character to virtually embody, wherein the third character is separate and distinct from the first character and the second character, and wherein virtually embodying the third character enables a second user to record one or more of the motion and/or the sound to be made by the third character within the compiled virtual reality scene;

contemporaneous to receiving the second request, receive a third request to capture the motion and/or the sound for the third character; and contemporaneous to recording the second motion capture information, record third motion capture information that characterizes the motion and/or the sound made by the second user as the second user virtually embodies the third character, wherein the third motion capture information is captured in a manner such that the actions of the second user are manifested by the third character are a reaction to the actions of the first user manifested by the first character and the actions of the first user manifested by the second character, such that the compiled virtual reality scene includes animation of the first character, the second character, and the third character such that the first character, the second character, and the third character appear animated within the compiled virtual reality scene contemporaneously.

3. The system of claim 2, wherein the first user and the second user are different.

4. The system of claim 3, wherein the first user and the second user are associated with different computing devices located at different physical locations.

5. The system of claim 2, wherein the first motion capture information characterizes the motion and/or the sound made by the first user, the second motion capture information characterizes the motion and/or the sound made by the first user, and the third motion capture information characterizes the motion made by the second user and the sound made by a third user.

6. The system of claim 5, wherein the third user is different from the first user and the second user.

7. The system of claim 1, wherein the virtual reality content includes an editing scene, wherein the editing scene is an editing version of the compiled scene that is presented to the one or more users while recording motion capture information for one or more characters, wherein the editing scene includes the manifestation of the first user's actions by the first character presented contemporaneously to the first user while the second motion capture information is being recorded, and wherein the displays are configured to present the editing scene including one or more manifestations of one or more users' actions by one or more characters based on previously recorded motion capture information while recording subsequent motion capture information characterizing the motion and/or the sound made by the users as the users virtually embody one or more characters.

8. The system of claim 1, wherein the one or more processors are further configured by machine-readable instructions to receive selection of a start time within a timeline of the compiled scene that indicates when the first character should start manifesting the actions of the first user within the compiled virtual reality scene during playback of the compiled virtual reality scene.

9. The system of claim 1, wherein the one or more processors are further configured by machine-readable instructions to receive selection of one or more virtual objects, virtual scenery themes, and/or virtual scenery items for placement within an editing scene to be reflected in the compiled virtual reality scene.

10. The system of claim 1, wherein the one or more processors are further configured by machine-readable instructions to receive selection of a first facial expression for the first character, such that the first motion capture information includes the first facial expression for the first character and one or more of the actions of the first user are manifested in the compiled virtual reality scene by the first character with the first facial expression.

11. A method for generating and/or modifying three-dimensional scenes comprising animated characters based on individual asynchronous motion capture recordings, the method being implemented by one or more sensors, displays, and/or processors configured to perform the method, the method comprising:

generating, by the one or more sensors, output signals conveying information related to motion and/or sound made by one or more users in physical space, the sensors being configured to capture the motion and/or the sound made by the one or more users;

presenting, via the one or more displays, virtual reality content to one or more users, wherein presentation of the virtual reality content via a display simulates presence of a user within a virtual space that is fixed relative to physical space;

receiving, at the one or more processors, selection of a first character to virtually embody within the virtual space such that virtually embodying the first character enables a first user to record the motion and/or the sound to be made by the first character within the compiled virtual reality scene;

receiving, at the one or more processors, a first request to capture the motion and/or the sound for the first character;

recording, by the one or more processors, first motion capture information characterizing the motion and/or the sound made by the first user as the first user virtually embodies the first character, wherein the first motion capture information is captured in a manner such that actions of the first user are manifested by the first character within the compiled virtual reality scene;

receiving, at the one or more processors, selection of a second character to virtually embody, wherein the second character is separate and distinct from the first character, and wherein virtually embodying the second character enables the first user to record one or more of the motion and/or the sound to be made by the second character within the compiled virtual reality scene;

receiving, at the one or more processors, a second request to capture the motion and/or the sound for the second character, wherein responsive to receiving the second request to capture the motion and/or sound for the second character, a manifestation of the first user's actions by the first character is presented by the one or more displays to the first user;

contemporaneous to the presentation of the manifestation of the first user's actions by the first character, recording, by the one or more processors, second motion capture information that characterizes the motion and/or the sound made by the first user as reactions to the manifestation as the first user virtually embodies the second character, wherein the second motion capture information is captured in a manner such that actions of the first user are manifested by the second character contemporaneously with the actions of the first user manifested by the first character within the compiled virtual reality scene; and generating, by the one or more processors, the compiled virtual reality scene including animation of the first character and the second character such that the first character and the second character appear animated within the compiled virtual reality scene contemporaneously.

12. The method of claim 11, further comprising:

contemporaneous to receiving the selection of the first character, receiving, at the one or more processors, selection of a third character to virtually embody, wherein the third character is separate and distinct from the first character and the second character, and wherein virtually embodying the third character enables a second user to record one or more of the motion and/or the sound to be made by the third character within the compiled virtual reality scene;

contemporaneous to receiving second first request, receiving, at the one or more processors, a third request to capture the motion and/or the sound for the third character; and contemporaneous to recording the second motion capture information, recording, by the one or more processors, third motion capture information that characterizes the motion and/or the sound made by the second user as the second user virtually embodies the third character, wherein the third motion capture information is captured in a manner such that the actions of the second user are manifested by the third character are a reaction to the actions of the first user manifested by the first character and the actions of the first user manifested by the second character, such that the compiled virtual reality scene includes animation of the first character, the second character, and the third character such that the first character, the second character, and the third character appear animated within the compiled virtual reality scene contemporaneously.

13. The method of claim 12, wherein the first user and the second user are different.

14. The method of claim 13, wherein the first user the second user are associated with different computing devices located at different physical locations.

15. The method of claim 12, wherein the first motion capture information characterizes the motion and/or the sound made by the first user, the second motion capture information characterizes the motion and/or the sound made by the first user, and the third motion capture information characterizes the motion made by the second user and the sound made by a third user.

16. The method of claim 15, wherein the third user is different from the first user and the second user.

17. The method of claim 11, wherein the virtual reality content includes an editing scene, wherein the editing scene is an editing version of the compiled scene that is presented to the one or more users while recording motion capture information for one or more characters, wherein the editing scene includes the manifestation of the first user's actions by the first character presented contemporaneously to the first user while the second motion capture information is being recorded, and wherein the displays are configured to present the editing scene including one or more manifestations of one or more users' actions by one or more characters based on previously recorded motion capture information while recording subsequent motion capture information characterizing the motion and/or the sound made by the users as the users virtually embody one or more characters.

18. The method of claim 11, further comprising receiving, at the one or more processors, selection of a start time within a timeline of the compiled scene that indicates when the first character should start manifesting the actions of the first user within the compiled virtual reality scene during playback of the compiled virtual reality scene.

19. The method of claim 11, further comprising receiving, at the one or more processors, selection of one or more virtual objects, virtual scenery themes, and/or virtual scenery items for placement within an editing scene to be reflected in the compiled virtual reality scene.

20. The method of claim 11, further comprising receiving, at the one or more processors, selection of a first facial expression for the first character, such that the first motion capture information includes the first facial expression for the first character and one or more of the actions of the first user are manifested in the compiled virtual reality scene by the first character with the first facial expression.

* * * * *